July 25, 1933.   C. H. WOODRUFF   1,920,120
METHOD OF MANUFACTURING MOLDED MOTTLED ARTICLES
Filed Feb. 15, 1930
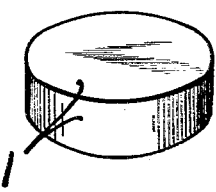
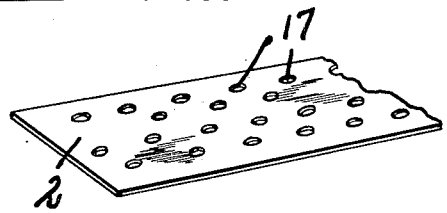
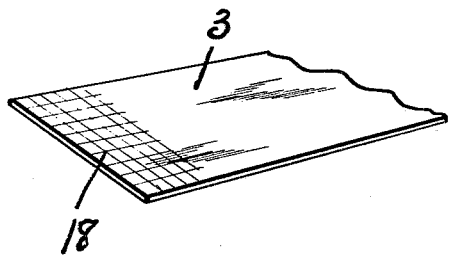
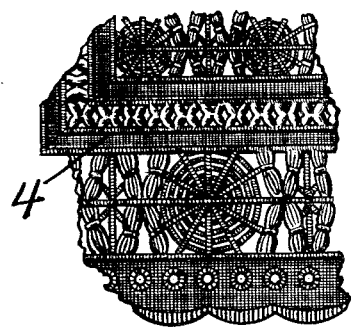
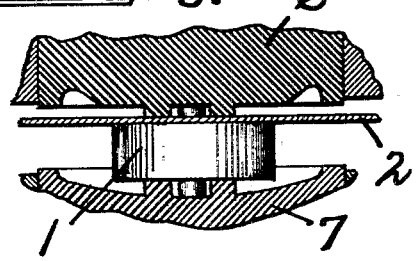
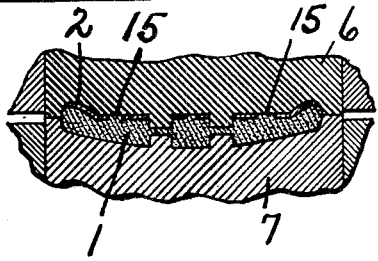
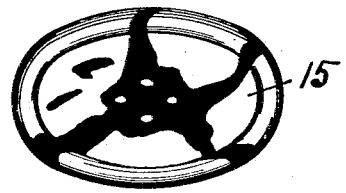
WITNESS
H. L. Meade
INVENTOR
Carlton N. Woodruff
BY
Denison Thompson
ATTORNEYS Patented July 25, 1933

1,920,120

UNITED STATES PATENT OFFICE

CARLTON HULBERT WOODRUFF, OF AUBURN, NEW YORK, ASSIGNOR TO AUBURN BUTTON WORKS, INC., OF AUBURN, NEW YORK, A CORPORATION OF NEW YORK

METHOD OF MANUFACTURING MOLDED MOTTLED ARTICLES

Application filed February 15, 1930. Serial No. 428,735.

This invention relates to certain new and useful improvements in the method of making molded mottled articles and to the product produced thereby.

The main object of the invention is the production of a molded multi-colored article of improved appearance, the varied coloring being either of irregular arrangement or following a predetermined stencil or pattern with reasonable accuracy or in substantial accordance for the purpose of this application the term "molded mottled article" is deemed to cover either such arrangement of varied colors.

A further object resides in the production of a more homogeneous integral article by utilizing for the coloring material or for its incorporator the same kind of material of which the base portion of the article is formed.

A further object resides in the provision of a process for producing such articles which is comparatively simple, can be carried out economically and without the necessity of providing any substantial additional equipment to that ordinarily used in molding similar uniform colored articles.

Other objects and advantages will appear from the following description taken in connection with the accompanying drawing in which:—

Figure 1 illustrates a pre-form or pellet of suitable material for forming the base of a molded article.

Figures 2, 3 and 4 illustrate sheets or thin layers of material which have been impregnated with the same sort of material of which the pre-form of Figure 1 is made, but adapted to be of different color if the sheets themselves are not otherwise colored or provided with designs.

Figures 5 and 6 illustrate the molding of a pre-form as illustrated in Figure 1 simultaneously with an impregnated sheet of material, as illustrated in Figs. 2, 3 and 4.

Figure 7 illustrates a product as produced by this invention.

The invention of this application is adapted to be carried out in connection with the various materials of which molded articles are formed, particularly in connection with molding under heat and pressure, and although the invention is more especially designed for use in connection with phenolic compounds such as bakelite, and for the purpose of illustration will be so described in this application, it is, however, usable with shellac thermo-plastic compounds, various other gums, celluloid, etc. ordinarily used in the molding of various articles such as buttons, knobs, ashtrays, containers, etc.

The description of this application as to the use of this invention in connection with phenolic compounds is deemed illustrative of the application of the invention to the various other substances or materials used in producing such molded articles.

The drawing illustrates the invention as particularly applied to a button, and for producing such article there is originally provided a pre-form or pellet 1 of suitable size and form for producing the desired article, and which in this instance consists of a phenolic compound such as bakelite powder pressed into the shape of the pre-form 1.

The bakelite pellet 1 is of the color desired for the body of the article to be molded, and in order to apply to one surface of this base material when molded, a mottled coloring either irregularly arranged or along the line of a predetermined design, lithograph or the like, there is provided a strip of material, either the strip 2 illustrated in Figure 2, the strip 3 illustrated in Figure 3, or the strip 4 illustrated in Figure 4, which is first impregnated with a liquid phenolic compound of the same character as the material constituting the pellet 1, but of a desired different color when the paper is not colored or provided with a design.

The strip impregnated with the phenolic material such as bakelite lacquer is then placed in the dies 6 and 7 in contact with one surface of the pre-form 1. These dies are ordinarily heated, and this may be effected in any suitable and well known manner not herein necessary to illustrate or describe.

It may be preferable to arrange die-section 7 as the upper section and die-section 6 as the lower section, although the arrangement and form of the dies is not an essential feature of this invention.

When pressure is applied to bring the die-sections 6 and 7 together, the heat in the usual manner softens the powdered material of the pellet and the material with which the sheet 2, 3, or 4 is impregnated, and as the two materials are the same or of substantially the same character, they are capable of uniting to form a homogenous integral unitary article.

It is found that when pressure is applied, the material of the pellet can be caused to spread out in the die and cause a cracking and breaking up of the material of the sheet 2, 3, or 4, which causes the production of somewhat irregular openings in the sheet, and the base material of pellet 1 is forced upwardly as at 15, Figure 7, to fill these openings so that it is exposed upon the surface of the button which also consists of the broken-up separated parts of the impregnated sheet and the different colored material carried thereby. For this reason, although it may be preferable to provide the sheet with openings 17 as shown in Figure 2, it is possible and practical to use an imperforate sheet 3, depending upon the irregular breaking up of the sheet if that is desired to provide the openings for receiving the base material of the pre-form 1.

On the other hand, in some cases it may be preferable to use a sheet 4 having a predetermined design with separated openings for the reason that even though the sheet may be caused to break up under the pressure of the dies, still a reasonable resemblance to the original design is reproduced by the combination of the broken-up sections of the stencil 4.

The sheets 2, 3 and 4 may perhaps preferably be formed of paper or wood fibre, or some reasonably brittle material which breaks up under pressure of the dies, although fabric may be used.

It may be desirable where an unperforated sheet such as sheet 3 is provided for impregnation with the same sort of material used for the base of the article, to weaken such sheet along predetermined lines as illustrated at 18, so that it will have a tendency to break up along the weakened lines and produce a somewhat irregular mottled design.

Further, under certain conditions it is found preferable to provide a sheet of paper, cloth, silk, or the like, such as shown in Figure 3 and provide it with a lithograph color-printed or otherwise produced design of desired shape and desired color or colors, and then impregnate the sheet with the same kind of material of which the base of the article is to be formed and of the same or a different color as may be desired. This sheet is then placed in the mold in the same manner as heretofore described in connection with the pre-form and it is possible to subject the pre-form and the impregnated sheet to pressure and heat without breaking up the impregnated sheet, so that the latter becomes the paper inlaid under the surface of the article and displaying substantially the exact design produced upon the paper sheet, and this invention contemplates either the use of a perforated sheet of paper or similar material, a stencil sheet or an unperforated sheet, any one of which may have produced upon them a suitably colored design and may then be impregnated with material, such as bakelite lacquer of the same color as the material of which the base of the article is to be formed or of a different color if desired.

Figure 7 illustrates a sort of mottled design as applied to the face side of a button, but is only illustrative and not intended as limiting the invention in any way.

Although the invention has been described in connection with a button as illustrative of an article to be produced and with a phenolic compound such as bakelite, as illustrative of a material to be used, these illustrations are utilized for the purpose of describing the invention as applied to an article formed of a perhaps preferred substance, and which is deemed to illustrate the invention in its application to many and varied moldable substances as commonly used in producing molded articles, and I do not herein desire to limit myself to any particular article or to any particular substance from which such article shall be formed except where the same are specifically included in the claims hereto appended.

I claim:

1. The method of manufacturing molded articles from phenolic compounds comprising placing in a mold a body of the material to be molded and a sheet of paper impregnated with the same kind of material but of different color, such sheet overlying the body of material and then subjecting the materials in the mold to heat and pressure whereby the material to be molded is spread out and the sheet of paper ruptured, and portions of the body of the material extend between separated parts of the paper sheet and are exposed at the surface of the article.

2. The method of manufacturing molded articles from plastics comprising placing in a mold a body of the material to be molded and a thin rupturable sheet comprising the same kind of material but of different color, such sheet overlying the body of material and then subjecting the materials in the mold to heat and pressure whereby the body of material is spread out and the sheet ruptured and integrally united to the body of material, with portions of the said body of material extending between separated parts of the ruptured sheet and exposed at the surface of the article.

CARLTON HULBERT WOODRUFF.